United States Patent [19]

Wreede et al.

[11] Patent Number: 4,808,500

[45] Date of Patent: Feb. 28, 1989

[54] STABILIZING HYDROPHILIC GELATIN HOLOGRAMS HAVING IMPROVED RESISTANCE TO SWELLING

[75] Inventors: John E. Wreede, Monrovia; Edward T. Knobbe, Playa Del Rey, both of Calif.

[73] Assignee: Hughes Aircraft Company, Los Angeles, Calif.

[21] Appl. No.: 123,496

[22] Filed: Nov. 20, 1987

[51] Int. Cl.$^4$ .............................................. G03H 1/04
[52] U.S. Cl. ........................................... 430/1; 430/2; 430/325; 430/289; 430/260; 430/264
[58] Field of Search ...................... 430/1, 2, 325, 289, 430/290, 264

[56] References Cited

U.S. PATENT DOCUMENTS

| | | | |
|---|---|---|---|
| 4,318,970 | 3/1982 | Kurland et al. | 430/2 |
| 4,329,409 | 5/1982 | Wreede et al. | 430/1 |
| 4,330,604 | 5/1982 | Wreede et al. | 430/2 |

FOREIGN PATENT DOCUMENTS

| | | | |
|---|---|---|---|
| 173873 | 10/1982 | Japan | 430/2 |
| 37679 | 3/1983 | Japan | 430/2 |
| 176002 | 9/1985 | Japan | 430/2 |

*Primary Examiner*—Paul R. Michl
*Assistant Examiner*—Patrick A. Doody
*Attorney, Agent, or Firm*—Leonard A. Alkov; A. W. Karambelas

[57] ABSTRACT

A method for treating photosensitive, hydrophilic gelatin holograms to reduce swelling when the gelatin is exposed to moisture. Two reactants which are capable of forming solid reaction products are migrated into the interstitial voids within the gelatin to form a filled gelatin which is resistant to both swelling and shrinkage due to moisture variations. Embodiments are disclosed in which the reactants are migrated simultaneously and sequentially into the gelatin. Examples of a first reactant are silane, chloronated silanes (trichlorosilane and tetrachlorosilane, fluorosilane) and a second reactant oxygen, ammonia, water vapor and suitable gaseous sources of oxygen.

32 Claims, 1 Drawing Sheet

STABILIZING HYDROPHILIC GELATIN HOLOGRAMS HAVING IMPROVED RESISTANCE TO SWELLING

BACKGROUND OF THE INVENTION

1. Field of the Invention

The present invention relates generally to holograms and the photosensitive hydrophilic gelatin layers which are present in holograms. More specifically, the invention relates to the susceptibility of gelatin layers to swelling caused by exposure to moisture.

2. Description of Related Art

Holograms are widely used for a variety of purposes including: helmet-mounted displays such as those disclosed in U.S. Pat. No. 3,928,108; eye protection reflectors for laser radiation; and novelty displays, such as pendant jewelry. In fabricating a hologram, a pre-holographic element comprising a hydrophilic, photosensitive layer on a substrate is processed to expose the photosensitive layer to an actinic interference pattern to record a latent image thereon. The photosensitive layer is then developed to obtain the recorded latent image.

The hydrophilic, photosensitive layers which are commonly used in holograms include photographic and holographic emulsions which utilize hydrophilic organic colloids as an emulsion vehicle. Dichromated gelatin, photographic silver halide emulsions, diazo gelatin and other photosensitive gelatins are examples of such materials. Typical thicknesses for the photosensitive layer is between about 1 micrometer to 100 micrometers. Layer thicknesses of 6–20 micrometers are most common.

A problem which has been experienced with photosensitive layers made from gelatins is that they are hydrophilic and tend to swell when subjected to moisture. Water is readily absorbed into the interstitial spaces present within the gelatin layer. The absorption of water causes the gelatin layer to swell and increase in thickness. This increase in layer thickness causes a shift in the wavelength. While this shift is more severe in reflection type holograms, it is present in all volume type holograms made by hydrophilic materials. If the wavelength shift is large enough, it will cause a spectral mismatch between the light source used to illuminate the hologram and the wavelength being reflected by the hologram. This is especially critical in applications where the spectral bandwidth of the source is very narrow, such as in the P-43 phosphor 5430 angstrom line, where the bandwidth is only about 40 angstroms wide. Further, the change in the gelatin layer thickness due to swelling and shrinking of the gelatin caused by changes in ambient moisture conditions can also produce continual undesired variations in the efficiency and quality of the hologram.

A cover or protective layer is placed over the photosensitive hydrophilic gel layer to protect the layer from damage due to abrasion and to prevent moisture from reaching the gelatin. The resulting hologram comprises a photosensitive gelatin layer which is sandwiched between a substrate and protective layer.

Plastic materials have been widely used as both the hologram substrate and protective layer due to their light weight, impact resistance and optical clarity. However, plastic materials are, by their nature, permeable to most gases, including water vapor. For example, polycarbonate is used as a substrate and cover for dichromated gelatin holograms in pilot's visors. The light weight, impact resistance and optical clarity of the polycarbonate makes it a desirable material for use in such pilot's visors. However, the inherent gas permeability of polycarbonate allows moisture to be transmitted through the polycarbonate within a few days thereby affecting the dichromated gelatin hologram.

Possible pilot's visors which have been suggested to eliminate moisture contamination of the gelatin hologram layer include visors made from glass, glass-plastic laminates and visors using a vapor deposited glass layer on the surface of the plastic. All of these proposed visors are open to further improvement. For example, glass alone is too heavy. Laminated structures in which thin layers of glass (approximately 0.003 inch) are laminated between plastic layers is acceptable for flat substrates but is difficult to work with when it must be spherically or toroidally formed. Further, cracking can occur upon minor impact.

The depositing of a layer of glassy or crystalline material onto the surface of a plastic visor in order to reduce permeability has shown some promise. These coatings are typically applied by various vapor deposition procedures, including sputtering and gas phase reactions. Since these coatings are all on the surface of the plastic, they are all subject to thermal stresses, abrasion and mechanical stresses. Problems have been experienced with these coatings in that they tend to fail under long exposure to high humidity and/or high temperatures. Further, it is difficult to vapor deposit glass as a layer on plastic without the formation of small pinholes.

Attempts to reduce the gas permeability of plastics are set forth in U.S. Pat. Nos. 4,318,970; 4,329,409; and 4,330,604. These patents disclose the use of crystalline and glassy deposited films and the use of thick layers of glass sandwiched between plastic. Also, prestressed plastics have been formed in which solid silicon particles are embedded in a plastic matrix and then subsequently oxidized by diffusing in oxygen gas. This results in a material with reduced permeability, however the material is not optically transparent. Also, the solid silicon has to be embedded in the plastic melt first with the subsequent treatment using oxygen gas to form $SiO_2$ aggregates. These $SiO_2$ aggregates are nearly the size of the silicon particles and not molecular in size. This results in a standard "filled" plastic which has the slight advantage of being stressed due to the increased size of the filler. However, the silicon particles are deposited randomly and therefore may not provide optimum reduction in permeability.

All of the above attempts to reduce the undesirable effects of moisture on hydrophilic gelatin holograms have involved preventing the moisture from contacting the gelatin. None of these solutions have been entirely satisfactory. Such glass and modified plastic materials having the desired gas impermeability are not suitable for many uses and they tend to be more elaborate and expensive than simple, single layer plastic substrates. Accordingly, there is a continuing need to find additional solutions to the problem of moisture absorption by hydrophilic gelatin holograms.

SUMMARY OF THE INVENTION

In accordance with the present invention the undesirable effects of moisture on hydrophilic gelatin holograms is reduced by stabilizing the gelatin itself rather than attempting to prevent moisture from reaching the gelatin.

The present invention has application to holograms comprising a layer of photosensitive, hydrophilic gelatin on at least a portion of a substrate. The gelatin has interstitial spaces dispersed throughout the gelatin which render the gelatin susceptible to swelling when the gelatin is exposed to moisture. The swelling which results from moisture uptake causes changes in the wavelength reflected by the hologram. The present invention reduces this problem by migrating first and second reactants into the interstitial spaces within the gelatin layer to form a solid reaction product within the interstitial spaces. The solid reaction product produces a "filled" gelatin which is resistant to swelling caused by moisture.

The solid reaction products which are formed in the interstitial spaces are very small and have little or no significant effect on the optical performance of the gelatin layer. Silicon dioxide is a preferred solid reaction product because it provides the desired resistance to swelling and shrinkage while having little significant effects on the optical properties. A solid reaction product is formed in the interstitial voids or spaces by gas migration reactions between: first reactants, such as silanes, chlorosilanes and fluorosilanes; and second reactants such as oxygen, ammonia and water vapor. For example with oxygen and silane a silicon dioxide solid reaction product is formed.

In a preferred embodiment of the present invention, the two reactants are simultaneously migrated into the hologram from opposite sides. The partial pressures of the reactants are controlled, depending upon the gas permeability of the substrate and gelatin layer, so that the reactants migrate into the gelatin layer where they react to form solid reaction products in the interstitial voids of the gelatin layers.

In another embodiment, the gelatin layer is treated sequentially with the reactants. A first reactant, such as tetrachlorosilane, is migrated into the gelatin layer and then the gelatin layer is treated with a second reactant, such as oxygen.

The above-discussed and many other features and attendant advantages of the present invention will become apparent as the invention becomes better understood by reference to the following detailed description when considered in conjunction with the accompanying drawings.

DESCRIPTION OF THE PREFERRED EMBODIMENTS

Hydrophilic gelatins have structures which include interstitial voids or spaces. Moisture in the form of water vapor migrates through interstitial voids resulting in swelling of the gelatin. When moisture levels surrounding the gelatin are reduced, the water migrates out through the interstitial voids resulting in shrinkage of the gelatin. In accordance with embodiments of the present invention, gaseous reactants are migrated into the interstitial voids to form a solid reaction product which stabilizes the gelatin against swelling due to uptake of moisture. Suitable gaseous reactants include those which form solid reaction products that will not significantly affect performance of the gelatin when used in holograms. A preferred solid reaction compound is silicon dioxide. Silicon dioxide may be formed by the combination of a first reactant, such as silane, chlorinated silanes (trichlorosilane and tetrachlorosilane), fluorosilane and organometallics containing titanium and aluminum with a second reactant such as oxygen, ammonia, water vapor or any suitable gaseous source of oxygen to fill the interstitial spaces in the zone of reaction. It should be noted that water will not effectively react with silane.

The present invention can be used to stabilize a wide variety of gelatin materials used in making holograms. One limitation is that the hydrophilic gelatin material must not itself react with the various reactants used to form the solids which fill the interstitial voids of the gelatin. Suitable photosensitive, hydrophilic gelatin materials which can be treated include for example dichromated gelatin, diazo gelatin and silver halide emulsions. The following detailed description will be limited to gelatins used in preparing holograms for pilot visors and the like, with it being understood that the present invention has application to other hydrophilic materials used in holograms. For example, even less hydrophilic photopolymers such as polyvinyl carbazoles or polyvinyl alcohols would benefit from the described process.

Figure 1:
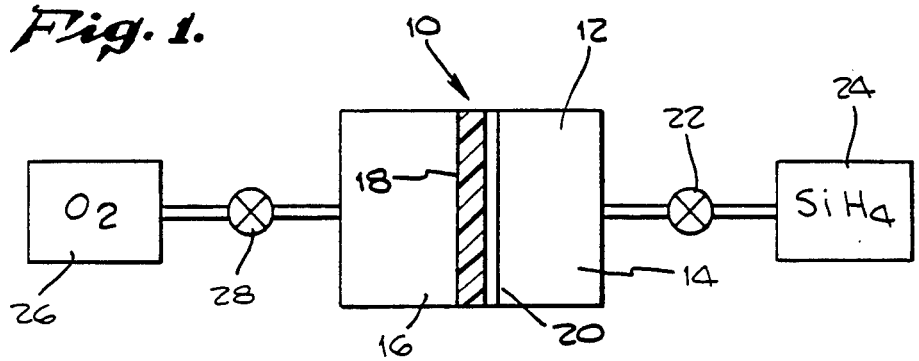
FIG. 1 is a schematic representation of a preferred embodiment of the present invention wherein the reactants are introduced onto opposite sides of the gelatin hologram-substrate structure. This figure shows the structure diagrammatically prior to treatment.
Figure 2:
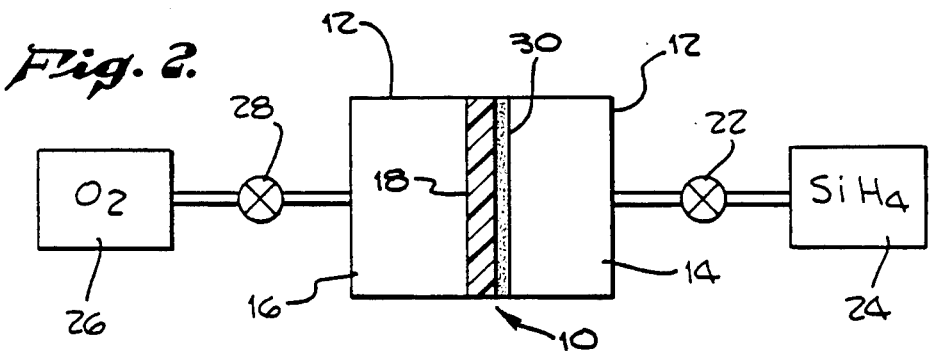
FIG. 2 is a diagrammatic representation of the preferred embodiment shown in FIG. 1 wherein the gelatin hologram-substrate structure is shown after treatment.

A first exemplary embodiment of the present invention is shown schematically in FIGS. 1 and 2. In FIG. 1, a completed hologram shown generally at 10 is placed within a suitable reaction chamber 12 such that the hologram 10 effectively divides the chamber 12 into a first reactant chamber 14 and a second reactant chamber 16. The hologram 10 includes a plastic substrate 18 and a hydrophilic gelatin layer 20. The substrate 18 can be any of the plastic materials conventionally used as hologram substrates. These plastics include for example silicone rubbers, polycarbonate, polypropylene, polystyrene, acrylic, polyethylene, polyesters, and cellulose acetate. The thickness of substrate 18 will depend upon the intended use for the hologram. Thicknesses for the substrate of between about 0.002 inch and about 0.25 inch are preferred. The plastic must also be sufficiently gas permeable so that the reactant in first reactant chamber 14 can migrate through the substrate layer 18 and into the hydrophilic gelatin layer 20.

The thickness of gelatin layer 20 is conventionally between about 1 to 100 microns. Preferred gelatin layer 20 thicknesses are from about 6 to 20 microns.

The hologram 10 is placed within chamber 12 after holographic processing is completed. The gelatin is not treated in accordance with the reaction process prior to holographic development because standard holographic development includes a swelling step in a water solution followed by rapid dehydration in alcohol. Treatment of the gelatin in accordance with the present invention prior to such standard holographic development would retard the swelling which is necessary for proper hologram processing and development. In addition, the presence of a solid filler within the gelatin during holographic exposure could cause some light scatter and noise. Accordingly, it is preferred that all holographic processing be completed prior to placing the hologram 10 into chamber 12 for treatment. It is important that the two chambers 14 and 16 on either side of hologram 10 be completely sealed from each other to prevent uncontrolled mixing of the first and second reactants and possible uncontrolled reactions such as an explosion or an implosion.

Valve 22 controls the flow of the first reactant into the first reactant chamber 14. The first reactant is kept in a suitable container which is shown diagrammatically at 24. For purposes of illustration, the first reactant is shown to be silane $SiH_4$ and the second reactant which is introduced from reservoir 26 through valve 28 is oxygen $O_2$. The relative amounts of oxygen and silane gas which are introduced into their respective chambers 14 and 16 can be varied depending upon the gas permeability of the particular plastic substrate 18 and the thickness of substrate 18. Further, the thickness and gas permeability of gelatin layer 20 must also be taken into consideration. For this particular embodiment, since oxygen diffuses at a faster rate than silane, the oxygen is introduced on the substrate side and the silane is introduced on the gelatin layer side within the chamber 12. The relative partial pressures of oxygen in chamber 14 and silane in chamber 16 are controlled so that the oxygen migrates completely through substrate 18 and into hydrophilic layer 20 while silane migrates only into the gelatin layer 20. This control of partial pressures results in the gas phase reaction between silane and oxygen taking place primarily in the gelatin layer 20. This gas phase reaction results in the formation of solid silicon dioxide ($SiO_2$).

The silane and oxygen react at a gas phase reaction interface located within the gelatin layer 20. The reaction is self-limiting since the reaction product is solid silicon dioxide which effectively fills the interstitial spaces and blocks further diffusion of the gases through the gelatin layer 20 and hence prevents further reaction. In addition, it is believed that the reaction rate between silane and oxygen is not just dependent on the rate of diffusion of the reactant species, but on the number of diffused molecules which have sufficient energy to react. Thus, even though silane and oxygen react uncontrollably at room temperature, their reaction proceeds quite controllably when the molecules are mixed at a low rate during diffusion into the gelatin layer 20. The depth of the reaction zone wherein solid silicon dioxide is formed is about the same thickness as the gelatin layer. Accordingly, a substantial portion of the interstitial voids or spaces present in the gelatin layer are filled with silicon dioxide.

Figure 3:
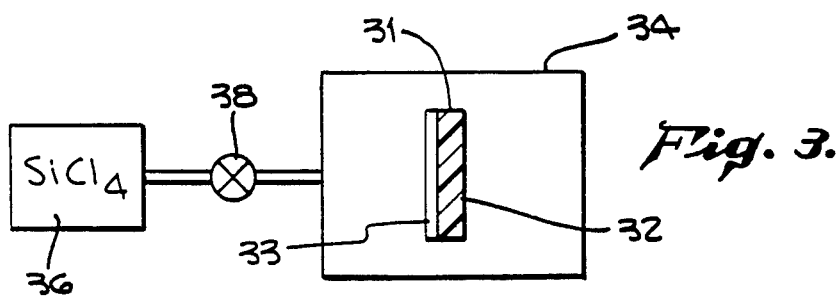
FIG. 3 is a diagrammatic representation of a second embodiment of the present invention wherein the first reactant is added to the gelatin hologram prior to the second reactant.
Figure 4:
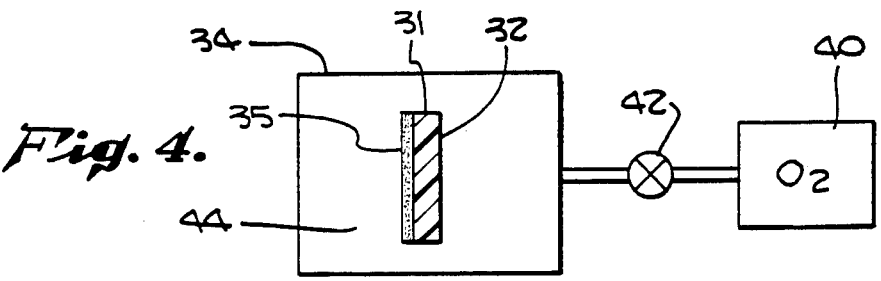
FIG. 4 is a diagrammatic representation of the second exemplary embodiment showing the structure after the second reactant has been diffused into the gelatin hologram.

A second embodiment of the present invention is shown in FIGS. 3 and 4. This embodiment involves the sequential addition and diffusion of reactants into the gelatin layer. Referring to FIG. 3, a processed hologram 31 is placed within a chamber 34 for treatment. The hologram 31 includes substrate 32 and hydrophilic layer 33. A first reactant gas is entered into chamber 34 from reservoir 36 via valve 38. The gas can be any of the first reactants previously described, however, tetrachlorosilane $SiCl_4$ is preferred. The tetrachlorosilane is allowed to diffuse into the gelatin layer 33 for a sufficient time and at a sufficient temperature so that migration of tetrachlorosilane throughout the thin gelatin layer is substantially complete. The chamber 34 is then purged at the first reactant and oxygen $O_2$ or other second reactant described above is introduced as shown in FIG. 4 from a reservoir 40 via valve 42.

As the oxygen begins to migrate into the gelatin layer 33, it reacts with the tetrachlorosilane present in the interstitial voids to form solid silicon dioxide. The formation of solid silicon dioxide occurs substantially throughout the reaction zone of the relatively thin gelatin layer to produce a filled gelatin layer 35 which is resistant to swelling and shrinkage due to variations in moisture in the ambient atmosphere. In addition, a gas impermeable barrier is formed around the outside surface of plastic substrate 32 during this process. The formation of this gas impermeable barrier in the substrate provides additional protection from moisture on at least one side of the stabilized gelatin layer 35.

Nitrogen flush systems (not shown) are preferably provided for the apparatus schematically represented in the figures so that the reactant chambers can be purged prior to introduction of the reactants.

The following examples involve stabilization of dichromated gelatins which are coated onto cellose acetate or other polymer substrate by dip, cast or spin coating as is well-known in the literature. Spin coating is preferred for small samples. The gel solution is 8% by weight of 300 bloom strength gelatin and 20 m molar in ammonium dichromate, the rest being water. An 0.010 inch thick layer of this solution will dry to about a 17 micrometer thick film after 24 hours at 30% relative humidity. It still contains approximately 10% $H_2O$ by weight. Holographic exposure is in the order of 200 mj/cm$^2$ of 5145 angstrom light from an argon laser. After exposure, the excess dichromate is washed out and the gelatin is swollen by immersion in a water solution. Rapid dehydration in alcohol causes a differential shrinkage for the gelatin molecules crosslinked by the dichromate by the action of the light and those gelatin molecules which did not see light. The differential shrinkage results in a refractive index variation between exposed and unexposed gelatin. The periodic structure of the refractive index variation constitutes the fringes of a phase hologram.

The gelatin molecules are frozen in this periodic structure as long as no water is present. Re-entry of water into the gelatin matrix causes a partial solution of the gelatin taking the form of a molecular rearrangement so that the index variation is greatly reduced. Only a partial solution taks place and the molecules do not move from the periodic structure since the hologram can be reprocessed multiple times by the swelling and dehydration steps after the hologram is destroyed by moisture with only minimal losses.

Most attempts in fixing the holographic structure consist of hardening the gelatin to make it more insoluble in water. This method involves not reducing the solubility (solubility being defined as the probability of molecular rearrangement in the presence of a solvent) of gelatin but of fixing the molecules in space by the presence of a matrix of silicon dioxide. That is - not allowing the polymer molecules to uncoil due to a physical restriction.

An example of a method for providing a silicon dioxide matrix within the gelatin in accordance with the first described embodiment is as follows:

A fully developed dichromated gelatin hologram of the type described above is coated 17 micrometer thick on a transparent silicon elastomer substrate 0.010 inch thick. After processing to the desired holographic efficiency, the substrate is placed within the reaction vessel 12 of FIG. 1. After flushing the chamber with nitrogen, oxygen is introduced on the substrate side and silane on the gelatin side. A screen can be used to accommodate a pressure differential between the two since the substrate itself does not have sufficient physical strength. The preferred method is to reduce the partial pressure of the silane by dilution with nitrogen and have the same absolute pressure on the two sides. Absolute pressure is 10 atmospheres, dilution is $O_2$ - none; $SiH_4$ to 10% (90% $N_2$). Temperature is raised to approximately 80° C. over a 2 hour period and the reaction is allowed to continue at that temperature for 24 hours. Since water is a by-product of the reaction and water at this temperature would adversely affect the hologram, frequent flushing on both sides of the chamber is required to remove the water as it diffuses to the surface. If a more efficient flushing, or thinner gelatin were used, a higher temperature (to 140° C.) would reduce the reaction time to under 1 hour. Most, but not all, of the reaction occurs in the gelatin itself. Some of the reaction product goes into the silicone substrate where it serves to reduce the permeability of that material to moisture. At these elevated temperatures and pressures, extreme care must be exercised to prevent substrate pinholes and/or rupture. Volumes must be kept to a minimum at all times (i.e. free space in chambers 14 and 16 should be as small as practical).

An example of a method carried out in accordance with the second described embodiment is as follows:

A 17 micrometer layer of dichromated gelatin which has a volume phase hologram encoded within it is supported by an inert substrate such as glass. While within the reaction vessel 34, the sample is flushed with dry nitrogen gas at 1 atmosphere for approximately 1 hour. Dichlorosilane is introduced into the vessel and the substrate allowed to soak in the vapor (at 1 atmosphere) at 40° C. for 20 minutes to 1 hour. The vessel is again flushed with nitrogen and within one minute oxygen at 1 to 10 atmospheres is introduced into the vessel. The hologram is allowed to soak in this gas for approximately 10 minutes and then the system flushed again with nitrogen. The cycle is repeated multiple times: 20 minutes silane, 1 minute flush, 10 minutes oxygen, 1 minute flush. Five or more cycles should be given with some improvement with each cycle. Reaction vessel 34 should match as closely as possible, the shape of the substrate to minimize the volumes of gas for cost and safety considerations.

Another procedure is to soak the sample in liquid tetrachlorosilane. The sample is first soaked in liquid tetrachlorosilane at 20° C. for 20 minutes. The vessel is then flushed with nitrogen and within one minute oxygen is introduced at 1 to 10 atmospheres. The sample is soaked in this atmosphere for 10 minutes. As the silane is diffusing out of the sample, it reacts with the oxygen diffusing into the sample. The process can be repeated multiple times, but each time the reaction vessel must be thoroughly flushed with nitrogen for at least 2 minutes between the introduction of the different reactants.

In conducting the exemplary methods as set forth above, it is preferred that temperatures of about 40° C. to 80° C. be used to provide a desired rate of reactivity of the reactants as well as a desired rate of permeation or penetration. Also, photo-activated oxygen is preferred to because of its rate of reactivity. The use of halogenated silanes is also preferred which provides slightly less gas diffusion in the gelatin than non-halogenated silane, but a greater transfer by solubility thereby resulting in a net increase in total permeability of the molecule. In addition, the reactant gases can be mixed with inert gases, such as helium or nitrogen, to vary the relative partial pressures of the reactants. This is especially preferred in the first embodiment disclosed in FIGS. 1 and 2 wherein it is desirable to maintain equivalent pressures on both sides of the hologram.

In all of the above-described examples, unreacted reactants such as silane, oxygen, water and any inert gases or preliminary reaction materials will remain in the gelatin. It is preferred that these remaining unreacted species be removed by vacuum baking or other suitable process.

Having thus described exemplary embodiments of the present invention, it should be noted by those skilled in the art that the within disclosures are exemplary only and are not an exhaustive listing of all of materials and process parameters and that various other alternatives, adaptations and modifications may be made within the scope of the present invention. Accordingly, the present invention is not limited to the specific embodiments as illustrated herein, but is only limited by the following claims.

What is claimed is:

1. In a hologram comprising a layer of photosensitive, hydrophilic gelatin on at least a portion of a substrate, said gelatin having interstitial spaces dispersed throughout said gelatin layer, said gelatin layer being susceptible to swelling when said gelatin is exposed to moisture, said swelling resulting in changes in the optical characteristics by said hologram, wherein the improvement comprises:

migrating a first reactant into the interstitial spaces within said gelatin layer; and migrating a second reactant into the interstitial spaces within said gelatin layer wherein said first and second reactants react to form a solid reaction product within said interstitial spaces to thereby form a filled gelatin zone having increased resistance to swelling when exposed to moisture.

2. The improvement according to claim 1 wherein said first reactant is selected from the group consisting of silane, chlorosilane and fluorosilane.

3. A method according to claim 1 wherein said first reactant is an organometallic containing titanium or aluminum.

4. The improvement according to claim 1 wherein said second reactant is selected from the group consisting of oxygen, ammonia and water vapor.

5. The improvement according to claim 1 wherein said photosensitive hydrophilic gelatin is selected from the group consisting of dichromated gelatin, diazo gelatin and silver halide emulsions.

6. The improvement according to claim 1 wherein said first reactant is silane and said second reactant is oxygen.

7. The improvement according to claim 1 wherein said first reactant is tetrachlorosilane and said second reactant is oxygen.

8. The improvement according to claim 1 wherein said substrate is a plastic selected from the group consisting of silicone rubbers, polycarbonate, polypropylene, polystyrene, acrylic, polyethylene, polyesters, and cellulose acetate.

9. The improvement according to claim 1 wherein said layer of photosensitive, hydrophilic gelatin is on a first side of said hologram and said substrate is on a second side of said hologram and said substrate is gas permeable, wherein said first reactant is migrated into said hologram from said first side and said second reactant is migrated into said hologram from said second side.

10. The improvement according to claim 9 wherein said first reactant is selected from the group consisting of silane, chlorosilane and fluorosilane.

11. The improvement according to claim 9 wherein said second reactant is selected from the group consisting of oxygen, ammonia and water vapor.

12. The improvement according to claim 9 wherein said photosensitive, hydrophilic gelatin is selected from the group consisting of dichromated gelatin, diazo gelatin and silver halide emulsions.

13. The improvement according to claim 9 wherein said substrate is a gas permeable plastic selected from the group consisting of silicone rubber, polycarbonate, polypropylene, polystyrene, acrylic, polyethylene, polyesters, and cellulose acetate.

14. The improvement according to claim 9 wherein said first reactant is silane and said second reactant is oxygen.

15. The improvement according to claim 9 wherein said layer of photosensitive, hydrophilic gelatin is between about 5 to 20 microns thick.

16. The improvement according to claim 14 wherein said substrate is polycarbonate.

17. The improvement according to claim 1 wherein said first reactant is migrated into said layer of photosensitive, hydrophilic gelatin and then said second reactant is subsequently migrated into said layer of photosensitive, hydrophilic gelatin.

18. The improvement according to claim 17 wherein said first reactant is selected from the group consisting of silane, chlorosilane and fluorosilane.

19. The improvement according to claim 17 wherein said second reactant is selected from the group consisting of oxygen, ammonia and water vapor.

20. The improvement according to claim 17 wherein said substrate is a plastic selected from the group consisting of silicone rubber, polycarbonate, polypropylene, polystyrene, acrylic, polyethylene, polyesters, and cellulose acetate.

21. The improvement according to claim 17 wherein said photosensitive, hydrophilic gelatin is selected from the group consisting of dichromated gelatin, diazo gelatin and silver halide emulsions.

22. The improvement according to claim 16 wherein said layer of photosensitive, hydrophilic gelatin is between about 5 to 20 microns thick.

23. The improvement according to claim 17 wherein said first reactant is oxygen.

24. The improvement according to claim 17 wherein said second reactant is silane.

25. A moisture resistant hologram having a filled gelatin layer forme according to claim 1.

26. A moisture resistant hologram having a filled gelatin layer formed according to claim 9.

27. A moisture resistant hologram having a filled gelatin layer formed according to claim 17.

28. The improvement according to claim 23 wherein said first reactant is an organometallic containing titanium or aluminum.

29. The improvement according to claim 2 wherein said second reactant is selected from the group consisting of oxygen, ammonia and water vapor except that when said first reactant is silane, then said second reactant is selected from the group consisting of oxygen and ammonia.

30. The improvement according to claim 10 wherein said second reactant is selected from the group consisting of oxygen, ammonia and water vapor except that when said first reactant is silane then said second reactant is selected from the group consisting of oxygen and ammonia.

31. The improvement according to claim 18 wherein said second reactant is selected from the group consisting of oxygen, ammonia and water vapor except that when said first reactant is silane, then said second reactant is selected from the group consisting of oxygen and ammonia.

32. The improvement according to claim 1 wherein the steps of migrating said first and second reactants into said interstitial spaces is conducted after development of said hologram.

* * * * *